Patented Feb. 22, 1944

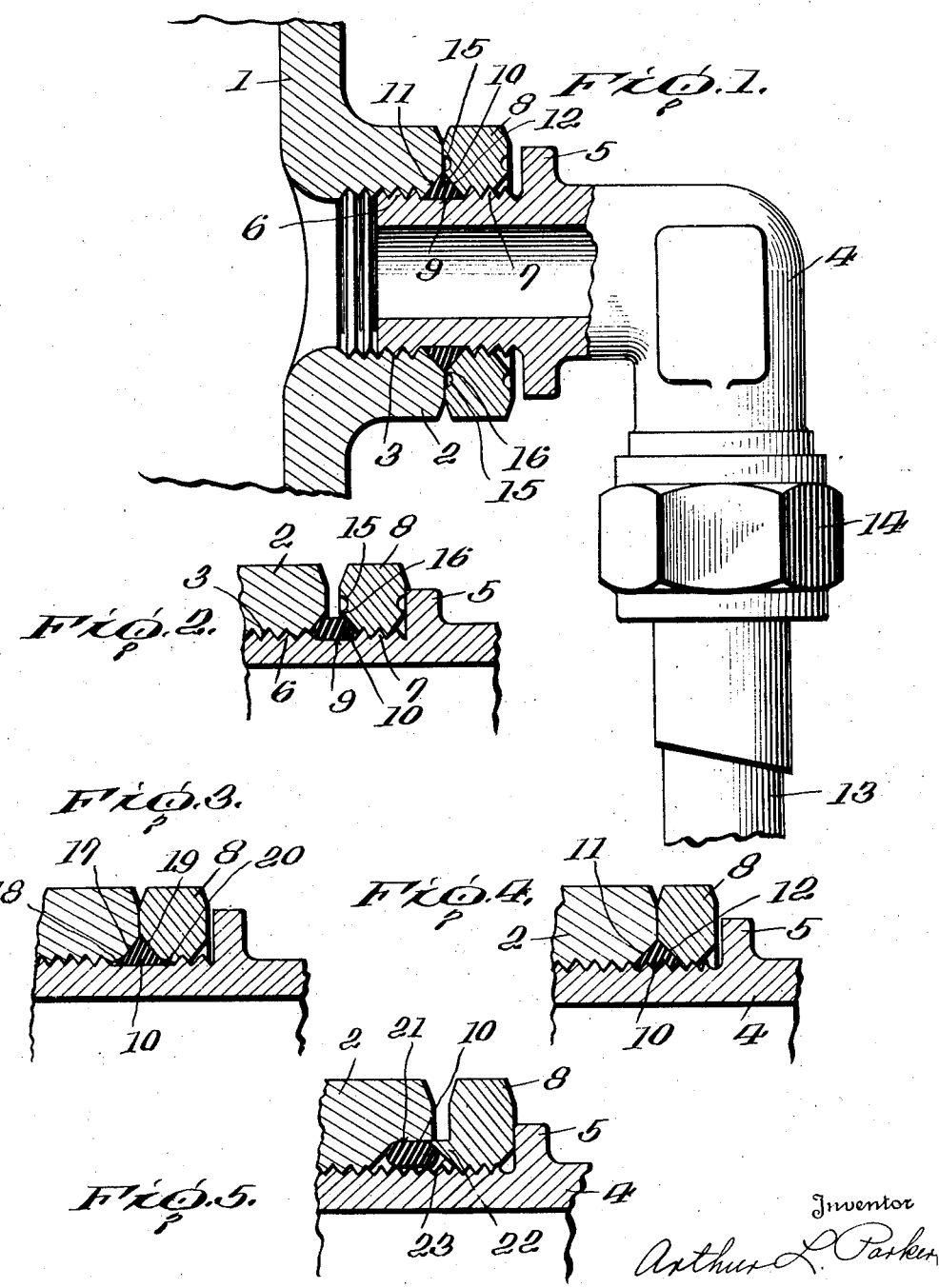

2,342,425

UNITED STATES PATENT OFFICE 2,342,425

PIPE COUPLING

Arthur L. Parker, Cleveland, Ohio, assignor to The Parker Appliance Company, Cleveland, Ohio, a corporation of Ohio Application March 31, 1941, Serial No. 386,220

2 Claims. (Cl. 285—55)

This invention relates to new and useful improvements in pipe couplings and more particularly to a coupling adapted for securing an elbow connection to a tank or the like.

An object of the invention is to provide a pipe coupling wherein the connection between the elbow and the tank may be made fluid tight for any angular setting of the elbow relative to the tank.

In the accompanying drawing:

Figure 1 is a view partly in side elevation and partly in section showing a coupling embodying the improvements.

Figure 2 is a sectional view, in part similar to Figure 1 but showing the parts as initially assembled before the closing of the coupling to establish fluid tight connection.

Figure 3 is a view similar to Figure 1 but showing a slightly modified form of the invention.

Figure 4 is a view similar to Figure 3 but showing a further modified form of the invention.

Figure 5 is a view similar to Figure 4 but showing a slightly modified shape of the sealing parts.

Referring to the drawing, the invention is illustrated as applied to the attaching of an elbow to a fixed part such as a tank. The tank 1 has a projecting boss 2 which is threaded as indicated 3. The elbow which is to be attached to the tank is indicated 4. The elbow has a projecting flange 5 and a threaded section 6 which is adapted to engage the thread 3 on the boss. The elbow also has a threaded section 7 which is spaced from the threaded section 6. A nut 8 engages the threaded section 7. Between the threaded sections 6 and 7, there is a smooth section 9. A ring gasket, preferably of rubber, indicated at 10 in the drawing is placed on the elbow between the threaded sections 6 and 7.

The boss is shaped so as to provide an inclined wall 11 at the outer end of the threaded section 3. The nut 8 is likewise provided with an inclined wall 12. These two walls 11 and 12 are inclined in opposite directions.

In the assembling of parts, the nut 8 is first threaded on to the elbow until it is brought into engagement with the flange 5. The ring gasket is then placed on the elbow in the smooth section as indicated in Figure 2. The elbow is then threaded into the boss until the gasket 10 is brought up against the inclined face 11. Then the elbow, if it is not in the proper angular relation to the tank is turned until it has a proper setting. When the elbow is set at a proper angle, then the nut 8 is turned up against the gasket and this compresses the gasket so as to make a fluid tight joint as shown in Figure 1. After the elbow is secured to the tank, then a pipe 13 may be connected thereto by the usual connection indicated at 14.

The nut 8 has an annular recess 15 formed in the face thereof which is adjacent to the outer end of the boss 2. This provides a relatively sharp edge 16. When the gasket is compressed by the inclined face of the boss and nut contacting therewith, it is likely to squeeze the rubber outward to a point between the nut and the boss. If this occurs, then the sharp edge 16 will cut the rubber projecting between these parts and the cutoff portion will lodge in the recess. This enables the nut to be brought into metal-to-metal contact with the boss and thus the elbow is firmly locked in a set angular position.

In Figure 3 there is shown a slightly modified shaping of the parts. The outer end of the boss has an inclined face 17 at approximately a 45° angle and an inclined face 18 more nearly at a 30° angle. The nut 8 has an inclined face 19 similar to the inclined face 17 but at a reverse angle and also an inclined face 20 similar to the inclined face 18. When the parts are thus shaped, the pressure against the gasket is greater in the region of the inclined faces 18 and 20 and, therefore, the gasket is not likely to be squeezed outward between the nut and the boss. In the construction shown in Figure 4, there is a further modified shaping of the parts. The inclined face on the boss is similar to the inclined face 11 as shown in Figure 1 and the inclined face 12 on the nut is likewise similar to the inclined face on the nut as shown in Figure 1. Instead of providing a smooth section in the elbow connector, the outer face is threaded all the way from the end of the elbow to the projecting flange. The assembling of the parts and the tightening of the joint is accomplished in the same way as described in connection with Figure 1.

In Figure 5 there is shown a further modification in the shaping of the parts. The elbow 4 with the flange 5 is of the same construction as shown in Figure 4. The boss 2 has a counterbore 21 formed therein to receive the gasket 10. The nut 8 has a projecting member 22 which is cylindrical and dimensioned so that it fits within the bore 21 in the boss. This projecting member has an inclined face 23. The parts are initially placed as shown in this Figure 5 and, after the elbow has been set at the proper angle to the tank, then the nut 8 is turned so as to force the member 22 into the recess formed by the bore 21 in the end of the boss and this will compress the gasket, forcing it against the boss and against the elbow, thus making a very tight joint.

While the invention is shown and described as applied to the attaching of an elbow to a fixed part, it will be understood that it may be employed for other uses wherever it is desired to secure a very tight fluid connection between a part and a pipe.

I claim:

1. A pipe coupling comprising a fixed member having a boss to which the pipe is to be attached, a pipe elbow having a threaded connection with said boss, a nut threaded onto said elbow and disposed adjacent to the outer end of the boss, said nut and boss having relatively flat opposed faces terminating adjacent the pipe in inclined faces providing a recess therebetween, a gasket in said recess, said gasket being dimensioned relative to the recess so that the nut may be turned to bring the flat faces into contact and at the same time force said gasket into sealing contact with the boss and pipe elbow.

2. A pipe coupling comprising a fixed member having a boss to which the pipe is to be attached, a pipe elbow having a threaded connection with said boss, a nut threaded onto said elbow and disposed adjacent to the outer end of the boss, said nut and boss having relatively flat opposed faces terminating adjacent the pipe in inclined faces providing a recess therebetween, a gasket in said recess, said nut having an annular groove in the flat face adjacent the inclined face forming an annular cutting edge for cutting off any portion of the gasket protruding outwardly between the flat faces.

ARTHUR L. PARKER.